March 12, 1963  R. T. ADAMS  3,080,762
GYROSCOPE
Original Filed March 5, 1957  2 Sheets-Sheet 1
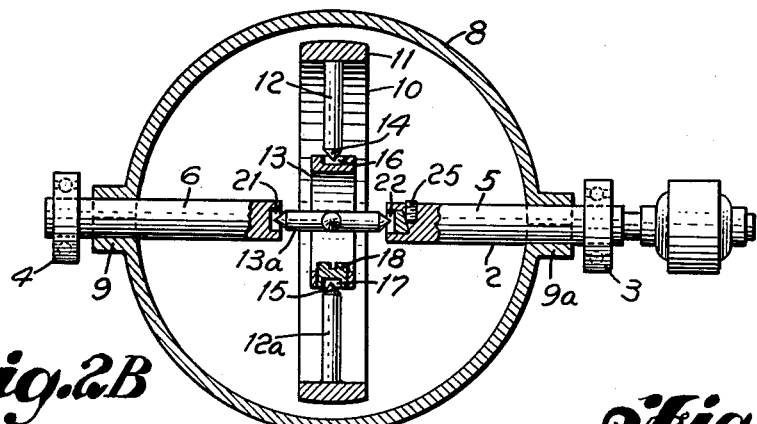
*Fig. 1*
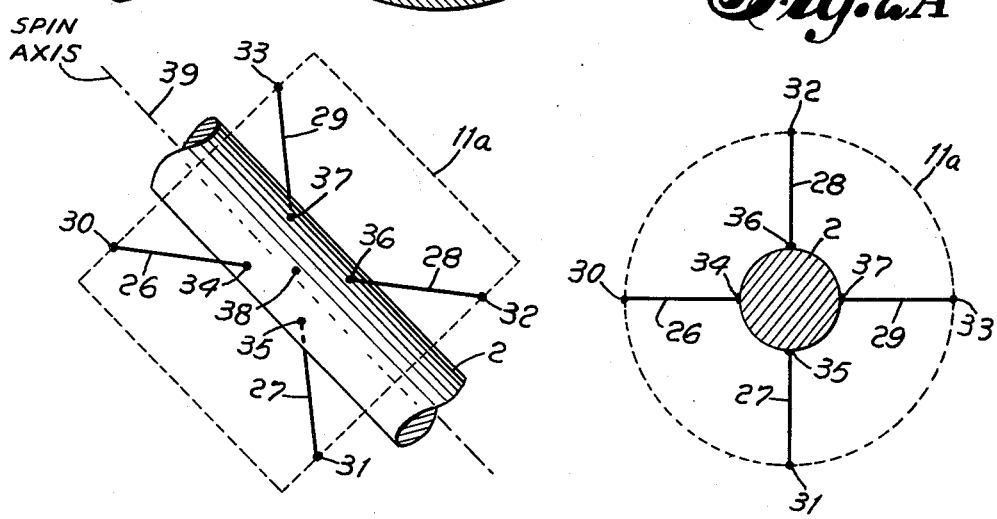
*Fig. 2B*  *Fig. 2A*  *Fig. 2C*
INVENTOR.
ROBERT T. ADAMS
BY
ATTORNEY

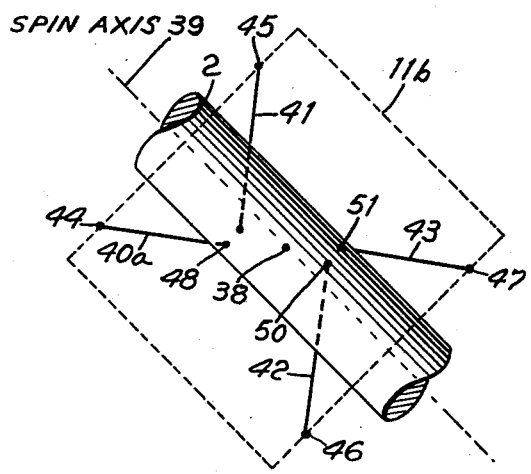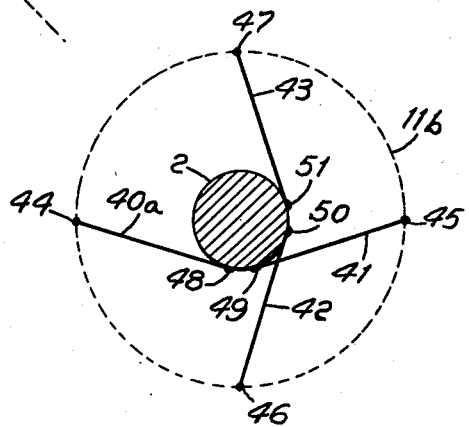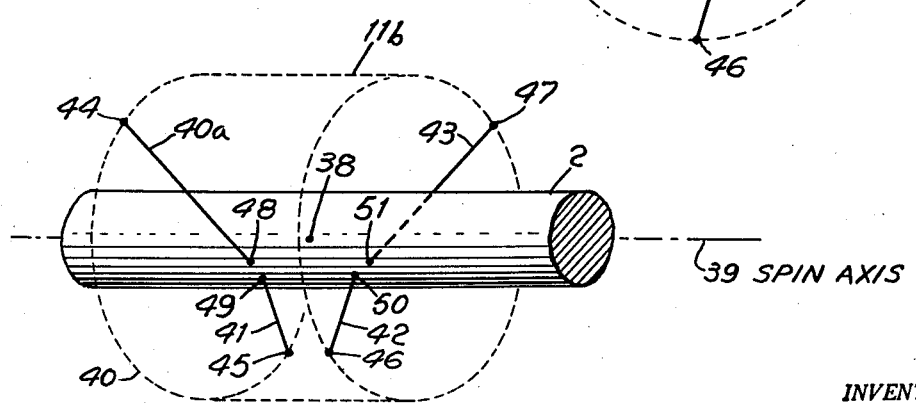

United States Patent Office 3,080,762
Patented Mar. 12, 1963

3,080,762
GYROSCOPE
Robert T. Adams, Short Hills, N.J., assignor to International Telephone and Telegraph Corporation, Nutley, N.J., a corporation of Maryland
Original application Mar. 5, 1957, Ser. No. 644,031, now Patent No. 2,947,178, dated Aug. 2, 1960. Divided and this application Nov. 5, 1959, Ser. No. 851,093
8 Claims. (Cl. 74—5)

This invention relates to gyroscopes and more particularly to a gyroscope wherein all the degrees of rotation freedom are provided within the gyro-wheel and is a division of application Serial No. 644,031, filed March 5, 1957.

The conventional gyroscope comprises a gyro-wheel or gyro-rotor spinning about its axis and supported by bearings so that its axis is free to rotate in one or more planes at right angles to the plane of spinning. The gyro-wheel is supported in a gimbal ring which in turn is supported in another gimbal ring; in this arrangement the gyro-wheel has three degrees of freedom of rotation. Gyroscopes have been devised which use a Hooke's or universal joint, instead of the gimbal rings to obtain two degrees of rotational freedom. It is arranged that the center of gravity of the rotor coincides with the center of suspension at the Hooke's joint coupling, thus forming a somewhat unconventional gyroscopic system having rotating gimbals. In gyroscopes there is present mass unbalance due to slop in bearings, friction, and uneven heating of parts which tends to shift the center of gravity of the rotor-wheel and thereby cause a torque to be exerted tending to rotate the shaft. This torque, even though slight, if manufacturing tolerances have been closely held, will cause precession of the gyro-rotor and thereby introduce error.

The Hooke's joint gyroscope presents the disadvantage that when it is operating at an angle, that is to say the axes of the joint and rotor do not coincide, forces are introduced which engender a fluctuating angular velocity component between the rotor and the drive shaft. Therefore, at certain positions of the Hooke's joint an increase in tilt angle will force the rotor to advance with respect to the shaft, and a decrease in tilt angle will cause the rotor to retard with respect to the shaft. In other words, the angle between the rotor and the drive shaft is coupled through this defect in the Hooke's joint to angular velocity variation between the rotor and the shaft. Therefore, the torque on the drive shaft can cause precession of the gyro and thus introduce additional error.

Due to the mass unbalance inherent in conventional gyroscopes as above described, it is necessary to provide a long warm-up time to reach operating conditions. This is so when starting torque is first applied to the motor which starts to heat up. Approximately 20 to 30 minutes is required before thorough heat balance ensues and the gyro is capable of correct operation. It is apparent that where immediate use is required of the gyro, such a long waiting period cannot be tolerated. Some important areas of use for gyros where time is of the essence and warm-up time cannot be allowed are gyros used in airplanes and in inertial navigation for guided missiles. The usual practice to obviate such conditions is to keep the gyros in continuous operation so that they will be ready instantly when emergencies arise. However, continuous operation of the gyros especially during the time when not in actual use decreases the operational life and thereby multiplies the cost.

A further disadvantage of conventional gyroscope design is that they require excessive space and weight. These are important factors to be considered in the application of gyroscopes to inertial guidance for guided missiles and for airplane use where both weight and space is at a premium.

An object of this invention is to provide a gyroscope with at least two degrees of freedom of rotation.

Another object is to construct a gyro in which the rotor attitude with respect to the shaft is unconstrained, permitting the rotor to seek a position free from axial unbalance and thus eliminate errors due to linear acceleration.

A further object is to provide a gyroscope which requires a minimum of space and weight in its construction.

A feature of this invention is a gyroscope wherein the gyro-mass or rotor is supported by means including filaments angularly disposed to provide for rotation with at least two degrees of freedom of rotation.

Another feature is the use of wire suspension coupling the gyro-wheel to the spinning member of the gyroscope.

The above-mentioned and other features and objects of this invention will become more apparent by reference to the following description taken in conjunction with the accompanying drawings, in which:

FIG. 1 is a vertical section of a gyroscope useful in describing this invention;

FIG. 2A is an end elevation view of an embodiment of this invention using one form of wire suspension means coupling the gyro-wheel to the spinning member;

FIG. 2B is an angle projection in plan of FIG. 2A;

FIG. 2C is a perspective view of the embodiment of FIGS. 2A and 2B;

FIG. 3A is an end elevation view of another embodiment of this invention using a skew form of the wire suspension means;

FIG. 3B is an angle projection in plan of FIG. 3A; and

FIG. 3C is a perspective view of the embodiment of FIGS. 3A and 3B.

With reference to FIG. 1, there is shown a gyroscope 1 mounted for spinning by means of the spin shaft 2 supported by two bearings 3 and 4, which may be ball bearings or any other suitable type of bearings. The spin shaft 2 consists of two sections 5 and 6 the axes of which coincide, coupled to a Hooke's joint 7 at approximately the midpoint of the spin shaft 2. An enclosure 8 is rigidly secured to the spin shaft 2 at positions 9 and 9a, and rotates with the spin shaft 2. The enclosure 8 is shown as a sphere, which is the most favorable form as it occupies the least space, but it may be of any other shape or configuration. The gyro-wheel 10 consists of a rim 11 and two spokes 12 and 12a supporting the rim 11 and coupling the rim to the Hooke's joint 17. The Hooke's joint 7 comprises a member 13 within which, and pivotable about the axis thereof, is a cross 13a. The spokes 12 and 12a have pivot points 14 and 15 which are rotatable in jewel bearings 16 and 17 inserted in the member 13. Jewel bearing 17 is carried in adjustable screw 18, which is used for adjusting the coupling of spokes 12 and 12a to the Hooke's joint 7 for maximum freedom of rotation of the spokes with minimum friction. The ends of cross 13a also have pivot points supported in jewel bearings 21 and 22 and two others not shown. Bearing 22 is supported in a holder 24 which is adjustably positioned by adjusting screw 25. It is obvious that the gyro-wheel 10 can rotate with the spin shaft 2 and also rotate independently of the spin shaft. Also the gyro-wheel 10 can rotate by means of the Hooke's joint configuration about two axes perpendicular to the spin axis of the gyroscope.

Regardless of the precision of manufacture, there will necessarily be some displacement of the center of gravity of the gyro-wheel 10 from the effective or kinematic center of the Hooke's joint 7. By deliberately increasing the radial unbalance and keeping the axial unbalance as small as possible the direction of this displacement can be made to fall within an angle $\theta$ from the radial, where $\theta$ is the angular freedom of the Hooke's joint. In operation the gyro-wheel will orient itself at an angle to the shaft, due to the influence of centrifugal forces such that the net mass unbalance is precisely radial with no axial component. In this condition, any component of acceleration or a gravitational pull in a radial direction will not produce a torque, because there is no axial unbalance. Any axial acceleration produces no steady torque because the direction of the radial unbalance is constantly reversing at the spin shaft rotation rate. Errors due to torque produced by axial unbalance are entirely eliminated providing, as is the case in this invention, the gyro-wheel is free to assume its own natural attitude with respect to the shaft.

Referring to FIGS. 2A, 2B and 2C, the configuration of the gyroscope 1 is similar to FIG. 1 except for the coupling of the gyro-mass or gyro-wheel rim 11a to the spin shaft. The rim 11a is coupled to the spin shaft 2, which is now a continuous shaft running from one end of the gyroscope to the other, by means of four filaments or wires 26, 27, 28 and 29 secured to the rim at points 30, 31, 32 and 33. Coupling points 33 and 30 lie in a first plane, and coupling points 31 and 32 lie in a second plane parallel to the first plane. The coupling points 30, 31, 32 and 33 are the apexes of a theoretical regular tetrahedron. The four wires are coupled to the spin shaft 2 at points 34, 35, 36 and 37, and if extended, the ends of the four wires would meet at a point 38 on the spin axis 39. Point 38 is the center of a theoretical regular tetrahedron and coincides with the center of gravity of the gyro-wheel 40. The tetrahedronal form of suspension requires the minimum number of filaments with equal elasticity in all directions.

Referring to FIGS. 3A, 3B and 3C, there is shown another version of the wire suspension embodiment. Four wires 40a, 41, 42 and 43 are coupled to the gyro-wheel rim 11b at points 44, 45, 46 and 47. Coupling points 44 and 45 lie in a first plane and coupling points 46 and 47 lie in a second plane parallel to the first plane. The coupling points 44, 45, 46 and 47 are the apexes of a theoretical regular tetrahedron. The other ends of the four wires are coupled to the spin shaft 2 at points 48, 49, 50 and 51 so that the respective wires are tangent to the spin shaft at these points and at a minimum distance from point 38 on the spin axis 39 which is the center of the theoretical tetrahedron and coincides with the center of gravity of the gyro-wheel 40. The tangent points 48 and 49 are on the same side of the spin shaft 2 and of a line joining points 44 and 45. The tangent points 50 and 51 are on the same side of the spin shaft 2 and of a line joining coupling points 46 and 47. The form of wire suspension shown in FIGS. 2A, 2B and 2C follows Hooke's law which states that within the elastic limit, deformation is proportional to stress, since due to the skewed wire arrangement, tension in any given wire varies linearly with torque, rather than increasing for both directions of torque. The skew form of each wire results in a torque between the spin shaft 2 and the rotor, but these torques are balanced by opposing skewed wires, so that the suspension does not unwind and go slack. The wire suspension restrains all three directions of linear movement and to some extent one degree of rotational freedom—in the direction of shaft rotation, but permits small angular freedom about the two axes perpendicular to the spin shaft 2. When the spin shaft 2 is rotating carrying with it the gyro-wheel 40, a tilt of the shaft axis 39 in any direction is not transmitted directly to the gyro-wheel which is free to continue rotating about its original axis. Due to the restoring force of the spring restraint in the wires, the spin axis of the gyro-wheel will precess or rotate slowly about the new (tilt) spin shaft axis, and at a constant angle to this axis; the rate of precession depending on the spring restraint stiffness of the wires and on the rotational mass of the gyro-wheel. The precession will continue until damped out by losses in the wire suspension which are very small or cancelled out by restoring not only the original spin shaft position but also the time integral of the shaft tilt to zero. However, the damping effect of friction in the bearings of conventional gyroscopes are so much greater than in the wire suspension of this invention that the accuracy of such conventional gyros is greatly reduced.

While I have described above the principles of my invention in connection with specific apparatus, it is to be clearly understood that this description is made only by way of example and not as a limitation to the scope of my invention as set forth in the objects thereof and in the accompanying claims.

I claim:

1. A gyroscope comprising a gyro-mass, a spin shaft, means including filaments supporting said gyro-mass to said spin shaft for rotation about the axis of said spin shaft, said filaments being angularly disposed to provide said gyro mass with at least two degrees of freedom of rotation with respect to the axis of said spin shaft and in a manner such that when the gyro-mass is in equilibrium and not spinning the spin axis thereof coincides with the axis of said spin shaft, the points of coupling of said filaments to said gyro-mass constituting the apexes of a theoretical tetrahedron, the center of the theoretical tetrahedron coinciding with the center of gravity of said gyro-mass.

2. A gyroscope comprising a gyro-mass, means for mounting said gyro-mass for rotation about a spin axis, the center of gravity of said gyro-mass coinciding with a point on said spin axis, said last-named means including a wire suspension for said gyro-mass comprising a plurality of wires, means for mounting said wires adjacent said spin axis, a portion of said wires being coupled to said gyro-mass at points in a first plane and a second portion of said wires being coupled to said gyro-mass at points in a second plane spaced from and parallel to said first plane whereby said gyro-mass has at least two degrees of freedom of rotation the points of coupling of said wires to said gyro-mass constituting the apexes of a theoretical tetrahedron, the center of the theoretical tetrahedron coinciding with the center of gravity of said gyro-mass.

3. A gyroscope comprising a gyro-mass, means for mounting said gyro-mass for rotation about a spin axis, the center of gravity of said gyro-mass coinciding with a point on said spin axis, said means including a wire suspension for said gyro-mass comprising four wires, means for mounting said wires adjacent said spin axis, a first pair of said wires being coupled to said gyro-mass at diametrically opposite points in a first plane and the second pair of said wires being coupled to said gyro-mass at diametrically opposite points in a second plane, spaced from and parallel to said first plane, the point coupling of said wires in said planes being such that a line drawn through the point couplings of said first pair of wires is at substantially right angles to a line drawn through the point couplings of said second pair of wires the points of coupling of said wires to said gyro-mass constituing the apexes of a theoretical tetrahedron, the center of the theoretical tetrahedron coinciding with the center of gravity of the gyro-mass.

4. A gyroscope comprising a gyro-mass, means for mounting said gyro-mass for rotation about a spin axis with the center of gravity of said gyro-mass coinciding with a point on said spin axis, said means including a wire suspension for said gyro-mass comprising four wires, means for mounting said wires so that extensions thereof would meet at said point on said spin axis, a first pair of said wires being coupled to said gyro-mass at diametrically opposite points in a first plane, and the second pair of said wires being coupled to said gyro-mass at diametrically opposite points in a second plane spaced from and parallel to said first plane, the point couplings of said wires in said planes being such that a line drawn through the point couplings of said first pair of wires is at substantially right angles to a line drawn through the point couplings of said second pair of wires the points of coupling of said wires to said gyro-mass constituting the apexes of a theoretical tetrahedron, the center of the theoretical tetrahedron coinciding with the center of gravity of the gyro-mass.

5. A gyroscope comprising an enclosure, means for mounting said enclosure for rotation about a spin axis, a gyro-wheel, means mounting said gyro-wheel within said enclosure with the center of gravity of said gyro-wheel coinciding with a point on said spin axis, said last-named means including a wire suspension for said gyro-wheel comprising four wires, means carried by said enclosure mounting said wires to said spin axis and tangent to the rotational means of said enclosure at a minimum distance from said center of gravity and tangent in such a manner as to provide balanced torques, a first pair of said wires being coupled to said gyro-wheel at diametrically opposite points in a first plane and the second pair of said wires being coupled to said gyro-wheel at diametrically opposite points in a second plane spaced from and parallel to said first plane, the point couplings of said wires in said planes being such that a line drawn through the point couplings of said first pair of wires is at substantially right angles to a line drawn through the point couplings of said second pair of wires the points of coupling of said wires to said gyro-wheel constituting the apexes of a theoretical tetrahedron, the center of the theoretical tetrahedron coinciding with the center of gravity of the gyro-wheel.

6. A gyrscope comprising a gyro-wheel, means for mounting said gyro-wheel for spinning about a spin axis, the center of gravity of said gyro-wheel coinciding with a point on said spin axis, said means including a wire suspension for said gyro-wheel comprising four wires, means mounting said wires adjacent said spin axis, a first pair of said wires being coupled to said gyro-wheel at diametrically opposite points in a first plane, and the second pair of said wires being coupled to said gyro-wheel at diametrically opposite points in a second plane spaced from and parallel to said first plane, the point couplings of said wires in said planes being such that a line drawn through the point couplings of said first pair of wires is at substantially right angles to a line drawn through the point couplings of said second pair of wires the points of coupling of said wires to said gyro-wheel constituting the apexes of a theoretical tetrahedron, the center of the theoretical tetrahedron coinciding with the center of gravity of the gyro-wheel.

7. A gyroscope comprising a gyro-wheel, means for mounting said gyro-wheel for spinning about a spin axis the center of gravity of said gyro-wheel coinciding with a point on said spin axis, said means including a wire suspension for said gyro-wheel comprising four wires, means mounting said wires so that extension thereof would meet at said point on said spin axis, a first pair of said wires being coupled to said gyro-wheel at diametrically opposite points in a first plane, and the second pair of said wires being coupled to said gyro-wheel at diametrically opposite points in a second plane spaced from and parallel to said first plane, the point couplings of said wires in said planes being such that a line drawn through the point couplings of said first pair of wires is at substantially right angles to a line drawn through the point couplings of said second pair of wires the points of coupling of said wires to said gyro-wheel constituting the apexes of a theoretical tetrahedron, the center of the theoretical tetrahedron coinciding with the center of gravity of the gyro-wheel.

8. A gyroscope comprising a gyro-wheel, means for mounting said gyro-wheel for spinning about a spin axis, the center of gravity of said gyro-wheel coinciding with a point on said spin axis, said means including a wire suspension for said gyro-wheel comprising four wires, means for mounting said wires to a spin shaft, the axis of which is said spin axis, and tangent to said spin shaft at a minimum distance from said center of gravity and tangent in such a manner as to provide balance torques, a first pair of said wires being coupled to said gyro-wheel at diametrically opposite points in a first plane and the second pair of said wires being coupled to said gyro-wheel at diametrically opposite points in a second plane, the point couplings of said wires in said planes being such that a line drawn through the point couplings of said first pair of wires is at substantially right angles to a line drawn through the point couplings of said second pair of wires the points of coupling of said wires to said gyro-wheel constituting the apexes of a theoretical tetrahedron, the center of the theoretical tetrahedron coinciding with the center of gravity of the gyro-wheel.

References Cited in the file of this patent

UNITED STATES PATENTS

| | | |
|---|---|---|
| 461,948 | Wilson | Oct. 27, 1891 |
| 1,670,077 | Mortier | May 15, 1928 |
| 2,212,346 | Kroon | Aug. 20, 1940 |
| 2,290,588 | Grondahl | July 21, 1942 |